(12) United States Patent
Fincato

(10) Patent No.: US 7,223,024 B2
(45) Date of Patent: May 29, 2007

(54) OPTICAL MODULE INCLUDING AN OPTOELECTRONIC DEVICE

(75) Inventor: Antonio Fincato, Cameri (IT)

(73) Assignee: STMicroelectronis S.r.l., Agate Brianza (IT)

( * ) Notice: Subject to any disclaimer, the term of this patent is extended or adjusted under 35 U.S.C. 154(b) by 69 days.

(21) Appl. No.: 11/015,363

(22) Filed: Dec. 17, 2004

(65) Prior Publication Data

US 2005/0163435 A1 Jul. 28, 2005

(51) Int. Cl.
*G02B 6/36* (2006.01)

(52) U.S. Cl. ............................. 385/88; 385/53; 385/89

(58) Field of Classification Search .................. 385/53, 385/88, 89
See application file for complete search history.

(56) References Cited

U.S. PATENT DOCUMENTS

| | | | |
|---|---|---|---|
| 4,699,453 A | 10/1987 | Roberts | 350/96.2 |
| 5,987,202 A | 11/1999 | Gruenwald et al. | 385/49 |
| 6,053,641 A | 4/2000 | Chun | 385/93 |
| 6,786,651 B2 * | 9/2004 | Raj et al. | 385/88 |
| 2003/0099273 A1 | 5/2003 | Murry et al. | 372/108 |

FOREIGN PATENT DOCUMENTS

JP 62-106686 5/1987

* cited by examiner

*Primary Examiner*—Jennifer Doan
(74) *Attorney, Agent, or Firm*—Lisa K. Jorgenson; Allen, Dyer, Doppelt, Milbrath & Gilchrist, P.A.

(57) ABSTRACT

An optical module includes a support substrate, and an optoelectronic device on the support substrate. A coupling device provides optical coupling of the optoelectronic device with an optical fiber. The coupling device is integrated in the substrate, and is a reflection device inserted into an optical path between the optoelectronic device and the optical fiber.

40 Claims, 6 Drawing Sheets

OPTICAL MODULE INCLUDING AN OPTOELECTRONIC DEVICE

FIELD OF THE INVENTION

The present invention relates to an optical module that can be used for coupling an optoelectronic device to an optical fiber.

BACKGROUND OF THE INVENTION

Many modules for coupling a laser diode or a photodetector to a wave guide, for example, are known, either in the form of conventional type optical fiber or in the form of integrated wave guides. In general, the coupling of optical components is a critical aspect in the design of optical apparatus because, in numerous applications, there is a requirement to ensure a high efficiency of coupling to allow optimum transfer of the radiation between the components themselves.

To obtain a high efficiency, due to the typical dimensions in question (on the order of a tenth of a micron), considerable accuracy is required in the mutual alignment and positioning between the devices to be coupled. This accuracy significantly affects the cost of production of an optical apparatus.

On this subject, U.S. Pat. No. 6,053,641 describes a module comprising a laser diode arranged on a support base, and a spherical lens held in position by a cap that rests on the support base itself. The lens is optically coupled to an optical fiber housed in a respective ferrule supported by a structure composed of two cylindrical elements welded together and globally resting on the support base.

U.S. Pat. No. 5,537,503 describes a semiconductor optical module including a light emission device, a lens that makes the light emitted by the device convergent and a glass fiber inserted into a ferrule. The module described in this patent also comprises a complex structure formed by a number of mechanical connection and support elements that hold in position the optical components to be coupled.

Conventional optical modules have the drawback of being relatively expensive and offering poor coupling efficiency unless complex techniques of alignment of the optical components are used.

SUMMARY OF THE INVENTION

An object of the present invention is to provide an optical module that provides a high coupling efficiency without requiring complex alignment techniques of the optical components.

This object is provided by an optical module comprising a substrate, an optoelectronic device on the substrate, and a coupling device on the substrate for optically coupling the optoelectronic device to a guided optical propagation device. The coupling device may comprise a reflective surface integrated into the substrate, and is positioned in an optical path between the optoelectronic device and the guided optical propagation device for permitting mutual optical coupling therebetween.

The reflective surface may receive incident optical radiation from the guided optical propagation device, and provides reflected optical radiation to the optoelectronic device. The reflective surface may comprise a concave reflective wall.

The reflective surface and the guided optical propagation device may be optically coupled without the interposition of lenses. Likewise, the reflective surface and the optoelectronic device may be optically coupled without the interposition of lenses.

The guided optical propagation device may comprise an optical fiber. The guided optical propagation device may further comprise a ferrule coupled to the optical fiber. The optical module may further comprise a blockage structure in direct contact with the guided optical propagation device for blocking a portion of the incident optical radiation received therefrom at a preset distance from the reflective surface.

The concave reflective wall may define at least a portion of one of the following surfaces: a spherical surface, a hyperbolic surface, an ellipsoidal surface and a parabolic surface. The substrate may comprise a concave base surface supporting the concave reflective wall. The substrate may comprise a first substrate portion and a second substrate portion adjacent the first substrate portion, with the first and second substrate portions having different thicknesses. The concave base surface is a joining surface between the first and second substrate portions.

The concave reflective wall may comprise a layer of conductive material. The coupling device may further comprise a layer of protective material for preventing oxidation of the concave reflective wall.

The optoelectronic device may comprise a laser for generating optical radiation to be sent to the guided optical propagation device by reflecting off of the reflective surface. Alternatively, the optoelectronic device may comprise a photodetector for receiving the reflected optical radiation from the reflective surface.

A conductive coupling pad may be between the optoelectronic device and the upper surface of the substrate. The optical module may further comprise a plurality of conductive leads, and a base substrate coupled to the substrate. The base substrate may provide an electrical connection between the plurality of conductive leads and the optoelectronic device.

A support and positioning structure may be coupled to the substrate for interfacing with the guided optical propagation device. The substrate may include a groove for receiving the support and positioning structure. In addition, the support and positioning structure may comprise a sleeve inside which the guided optical propagation device can be at least partially inserted.

Another aspect of the invention is directed to an optical apparatus comprising a guided optical propagation device, and an optical module adjacent the guided propagation device as defined above.

Yet another aspect of the invention is directed to a method for manufacturing an optical module to be optically coupled to a guided optical propagation device. The method may comprise positioning an optoelectronic device to a substrate, and forming a coupling device on the substrate for optically coupling the optoelectronic device to a guided propagation device. The coupling device may comprise a reflective surface integrated into the substrate, and is positioned in an optical path between the optoelectronic device and the guided propagation device for permitting mutual coupling therebetween.

BRIEF DESCRIPTION OF THE DRAWINGS

Further characteristics and advantages of the invention will be better understood from the reading of the following detailed description of example but non-limiting embodiments, illustrated in the attached drawings, wherein.

DETAILED DESCRIPTION OF THE PREFERRED EMBODIMENTS

Figure 1:
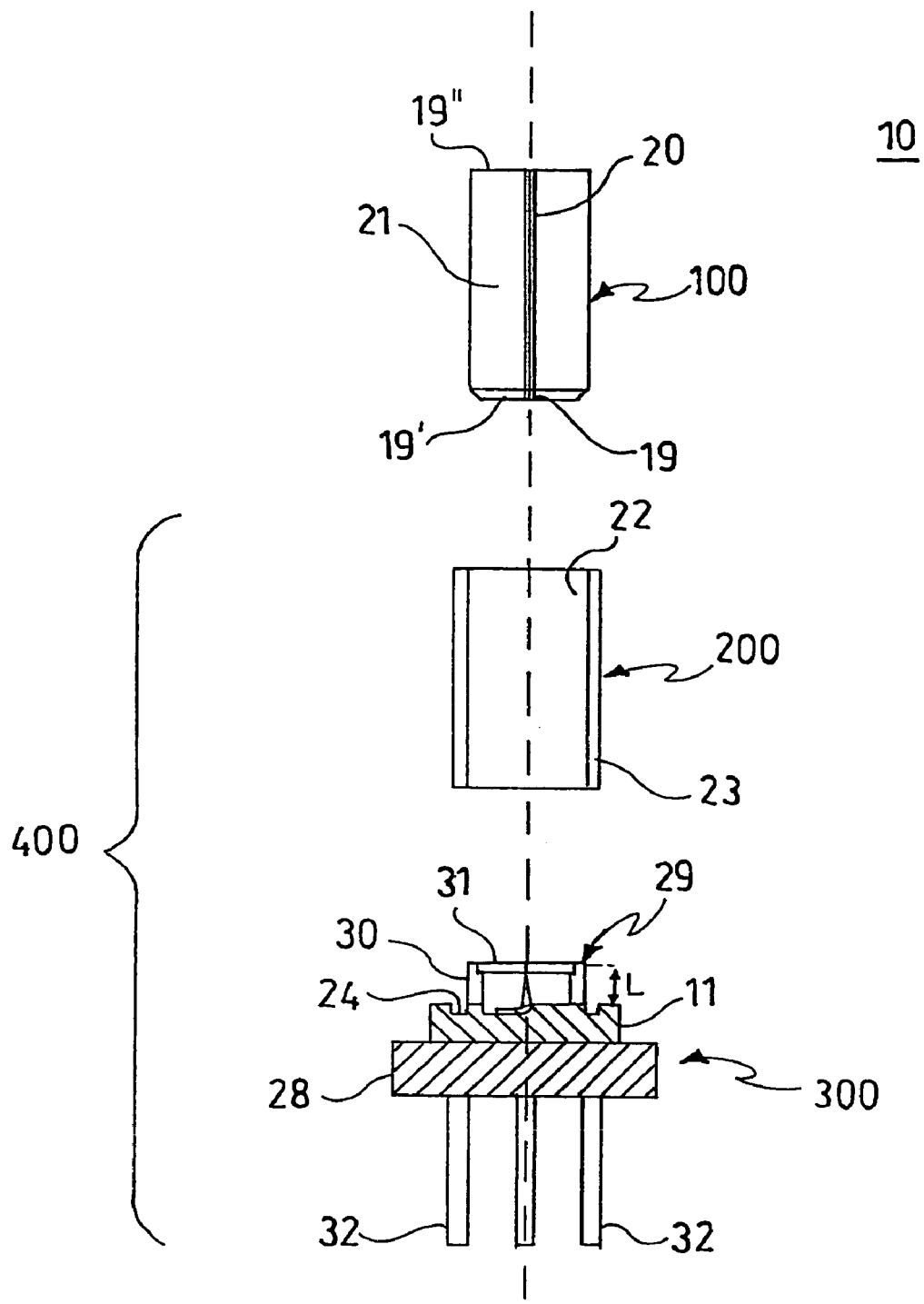
FIG. 1 is a sectional and exploded view of a preferred embodiment of an optical apparatus in accordance with the invention.
Figure 2:
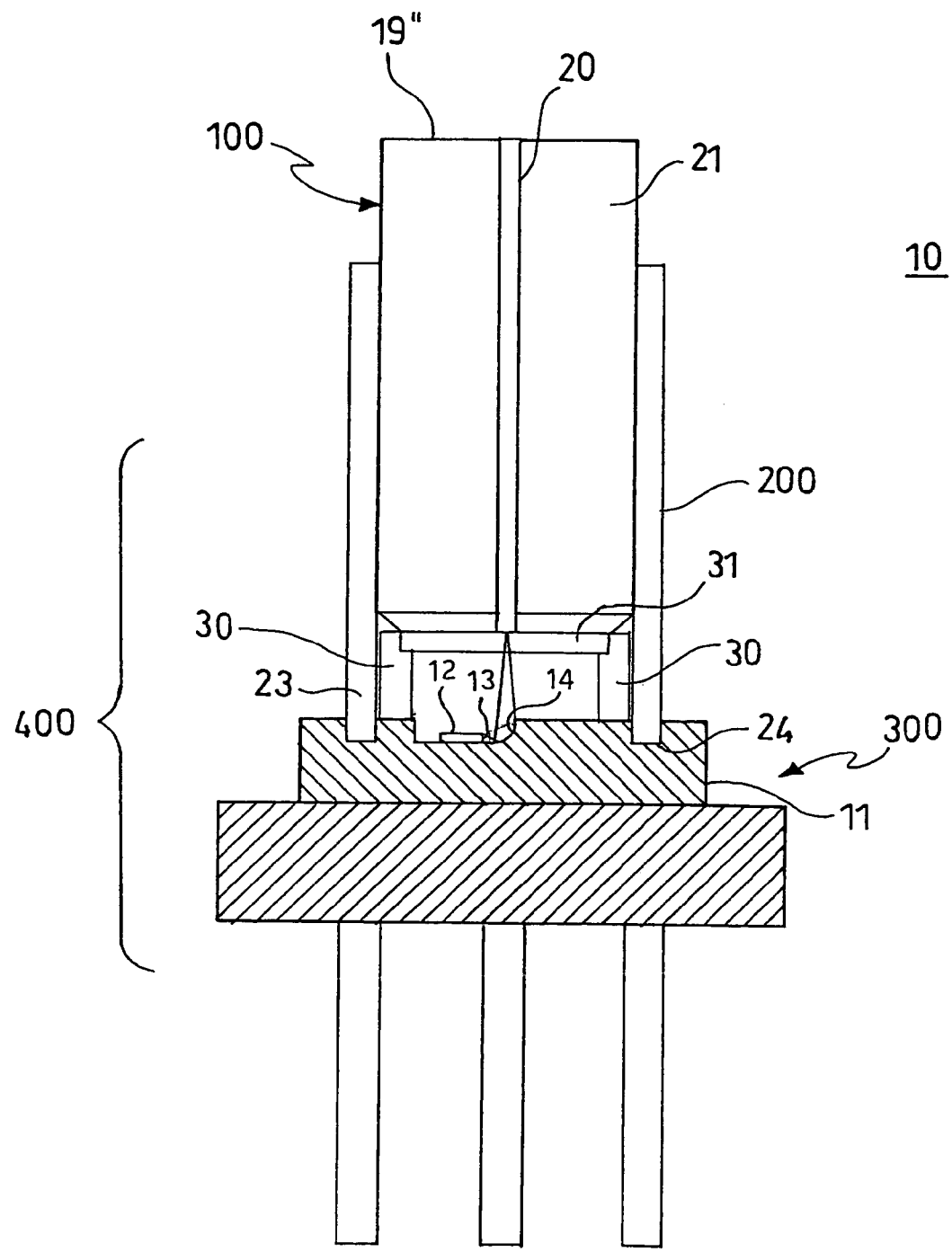
FIG. 2 is a side cross-sectional view of the optical apparatus in FIG. 1 assembled.

FIGS. 1 and 2 show an optical apparatus 10 in accordance with a first embodiment of the invention. The optical apparatus 10 comprises an optical module 400 and means 100 of guided propagation of electromagnetic radiation. The optical module 400 includes an optoelectronic module or unit 300 optionally provided with a structure 200 for positioning the propagation means 100. It is possible to supply the optoelectronic unit 300 alone, i.e., not coupled to the support structure 200 and without with propagation means 100. Alternatively, the optoelectronic unit 300 is coupled to the support structure 200 and may or may not be provided with the propagation means 100.

In greater detail, the propagation means 100 include an optical wave guide such as, preferably, an optical fiber 20 and a ferrule or bushing 21 that at least partially houses the optical fiber itself.

The optical fiber 20 is, for example, any conventional type fiber (monomodal or multimodal) and comprises a mantle, a nucleus or core and is devoid of an external plastic coating. In particular, the optical fiber 20 is made of vitreous material (for example, silicon dioxide SiO2). The optical fiber 20 can have an external diameter of approximately 125 μm. The dimensions of the core are, for example, 10 μm for monomodals and 50 μm (European standard) or 62.5 μm (American standard) for the multimodals. Other less used standards exist, for example: 9/125 μm, 8/125 μm, 6/125 μm for the monomodals, and 80/140 μm, 200/240 μm for the multimodals in which the diameter of the core/external diameter is indicated.

The ferrule 21 is made, for example, in zirconium or in steel and comprises a substantially cylindrical body that has an internal channel, centered on the axis of the cylinder for receiving the optical fiber 20. The ferrule 21 can be of the same type as those associated with the fiber connectors on the market. For example, the ferrule 21 has a diameter of the internal channel of 125 μm and an external diameter of 2.5 mm.

The mode of inserting the optical fiber 20 into the internal channel of the ferrule 21 and the operation of cutting the fiber itself are clear to those skilled in the art. Preferably, near one end of the optical fiber 20, the ferrule 21 has a substantially truncated cone shape. Moreover, according to the example in the figures, the optical fiber 20 presents one end 19, suitably processed to reduce the reflection of optical radiation, aligned with a wall 19' of the ferrule itself.

The positioning structure 200 includes, preferably, in a single sleeve an internal hollow region 22 for housing the ferrule 21. This sleeve 200 is to be mechanically coupled to the support substrate 11.

The sleeve 200 is, for example, of the type normally used for the connection of two ferrules and is generally known as a sleeve. The sleeve is, for example, in the shape of a cylinder devoid of a longitudinal portion and is made, typically, in zirconium. Advantageously, the sleeve 200 has an elasticity that allows it to exert a gripping force on the ferrule to which it is applied.

In agreement with one preferred embodiment of the invention, the sleeve 200 allows for the correct positioning and alignment of the propagation means 100 in relation to the optoelectronic unit 300. In particular, in the assembly step, the sleeve 200 is applied to the ferrule 21 (which wraps around the optical fiber 20) such that one outer edge 23 of the sleeve itself is free, and is protruding in relation to the ferrule itself.

Figure 3:
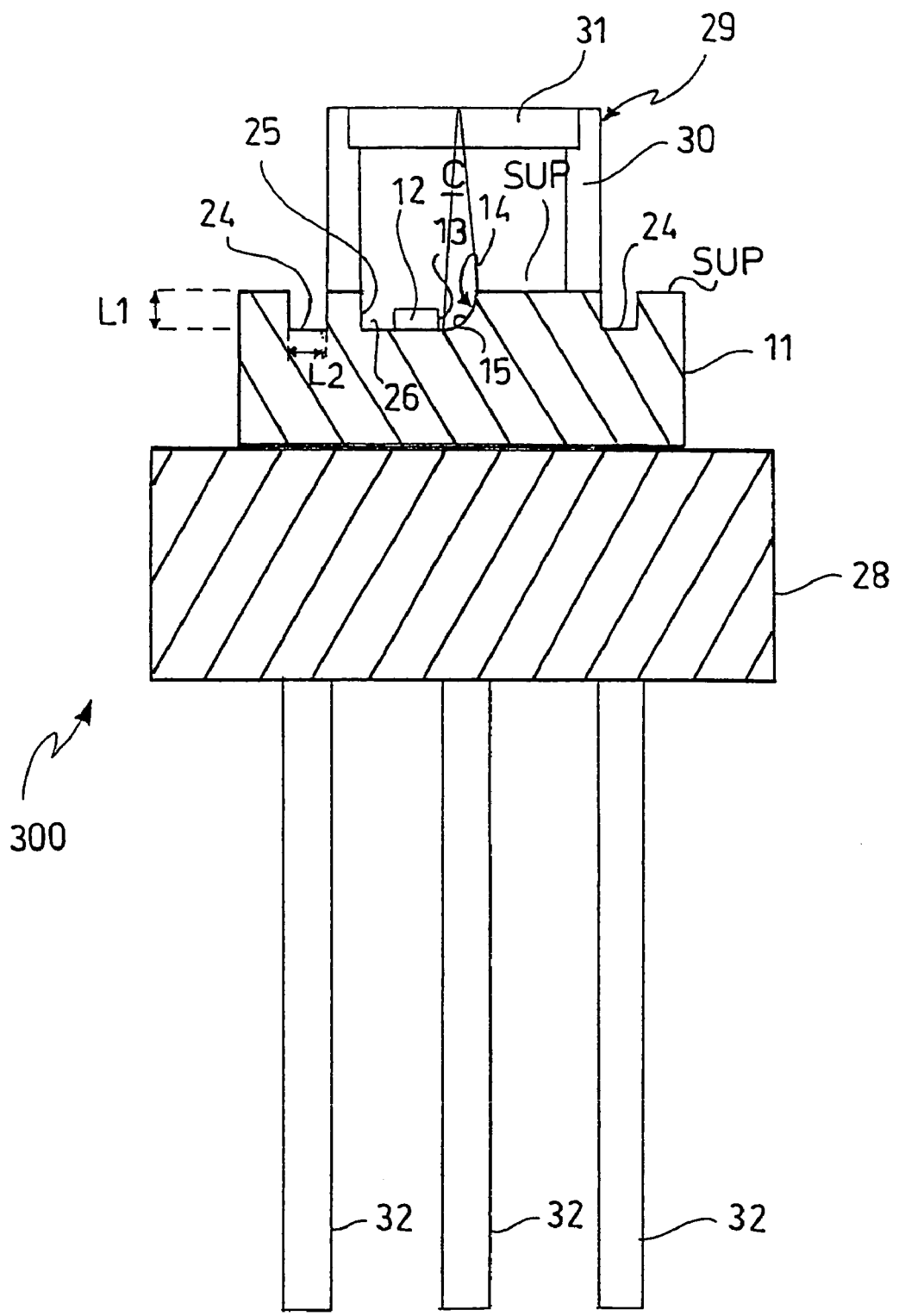
FIG. 3 is a side cross-sectional view of an optoelectronic unit that can be used in an optical apparatus in accordance with the invention.

Reference is now made to FIG. 3, which shows the optoelectronic unit 300 in greater detail. The optoelectronic unit 300 comprises a support substrate 11, an optoelectronic device 12 coupled to the substrate 11 and a reflection device 14 (i.e., a mirror) integrated into the substrate 11.

The support substrate 11 is preferably in silicon, but other materials, such as glass or alumina may also be used, for example. The support substrate 11 identifies an upper surface Sup and is provided with a fixing or coupling groove 24.

The groove 24 (for example, with a rectangular or square section) defines in the substrate 11 a path that is, for example, semicircular to receive the free edge 23 of the sleeve 20. The depth L1 and width L2 of the groove 24 has values to receive the edge 23 of the sleeve 200.

In addition, inside an area of the upper surface Sup delimited by the groove 24 there is a hollow region 25 having a bottom wall 26 that is, for example, aligned with the bottom wall of the groove 24.

In the support substrate 11 is the reflection device 14 including a reflective surface 15. The reflective surface 15 stretches from the bottom wall 26 to the upper surface Sup. One particular embodiment of the reflection and focusing device 14 will be described in greater detail below.

The optoelectronic device 12 is, for example, a semiconductor device. According to a first embodiment of the invention, the optoelectronic device 12 is a laser. For example, the laser 12 can be a conventional semiconductor laser. The laser 12 has a substantially parallelepiped shape and presents at least one principle output port or surface 13 of the electromagnetic radiation generated.

In particular, this output port 13 is positioned on one lateral face 27 of the laser 12 arranged in a transverse way and, in particular, perpendicular to the bottom wall 26 and facing towards the reflection device 14. For example, the laser 12 may have the following dimensions: height equal to approximately 100 μm, length between 300–400 μm, and width between 300–400 μm.

The support substrate 11 is suitably coupled to a base 28 having the function of support, and is suitable for the dissipation of the heat produced by the laser 12. The base 28 may be shaped like a disk, for example, and could be made in a metallic alloy such as, for example, an iron-cobalt-nickel alloy known as Kovar, or it can be made in a ceramic material.

Electrical leads 32 (for example, four leads) are inserted inside holes made in the base 28 and are in electrical contact with the support 11 for the supply of electrical voltage to the laser 12. In addition, the laser 12, in a lower portion, is provided with an upper electrical contact (not shown), for example, coinciding with a solder on the support 11 and, in an upper portion, it is in turn connected to a lower electrical contact connected to a conductive or bonding wire (not shown).

The optoelectronic unit 300 is also provided, advantageously, with a blockage structure 29 arranged on the upper surface Sup of the substrate 11 and extends inside the sleeve 200 when mounted to the substrate itself. The blockage structure 29 makes it possible to block the ferrule 21 at the preset distance L from the upper surface Sup. The distance L is chosen to put the port 19 of the optical fiber 20 at a preset distance from the reflection device 14.

According to the example shown in FIGS. 1–3, the blockage structure 29 includes a tubular body 30 made, for example, in a metallic material, and is coupled to a circular region of the upper surface Sup inside the area delimited by the sleeve 200. The blockage structure 29 is also provided with a window 31 that can be made, for example, in glass or plastic or with any other material substantially transparent to the wavelength of the radiation transmitted. In the present description a window is intended as a substantially transparent optical element made with a material having a substantially constant refraction index, and having two opposite radiation input/output surfaces (i.e., two surfaces interfacing with the surrounding space) that are flat and parallel to one another.

According to one particular embodiment, the window 31 has a disk shape and is applied to the upper edge of the tubular body 30 that acts as a support wall. Advantageously, this upper edge of the tubular body 30 is purposely shaped to favor geometric coupling with a crown of the window 31. Preferably, the window 31 is fitted with a metal coating on its crown so as to be fitted by soldering to the edge of the tubular body 30.

Alternatively, the blockage structure 29 can be made in a single block, for example, in plastic, including the tubular body 30 and the window 31. The blockage structure 29 defines together with the support substrate 11 a cavity C. The laser 12 and the reflection device 14 are housed in the cavity C.

According to one preferred embodiment of the invention, the optoelectronic unit 300 also includes a photodetection monitoring device such as, for example, a photodiode (not shown) having the function of monitoring the optical radiation generated by the laser 12.

The monitoring photodiode can be integrated into the substrate 11 or can be coupled to the upper surface Sup or in the cavity 25. The monitoring photodiode can detect optical radiation coming out from another port of the laser 12 which, according to the example described, is the radiation coming out of the wall of the laser opposite that 13 facing the reflection device 14. Alternatively, the monitoring photodiode can be arranged to receive a part of the radiation that in any case is re-reflected from the window 31.

Figure 4:
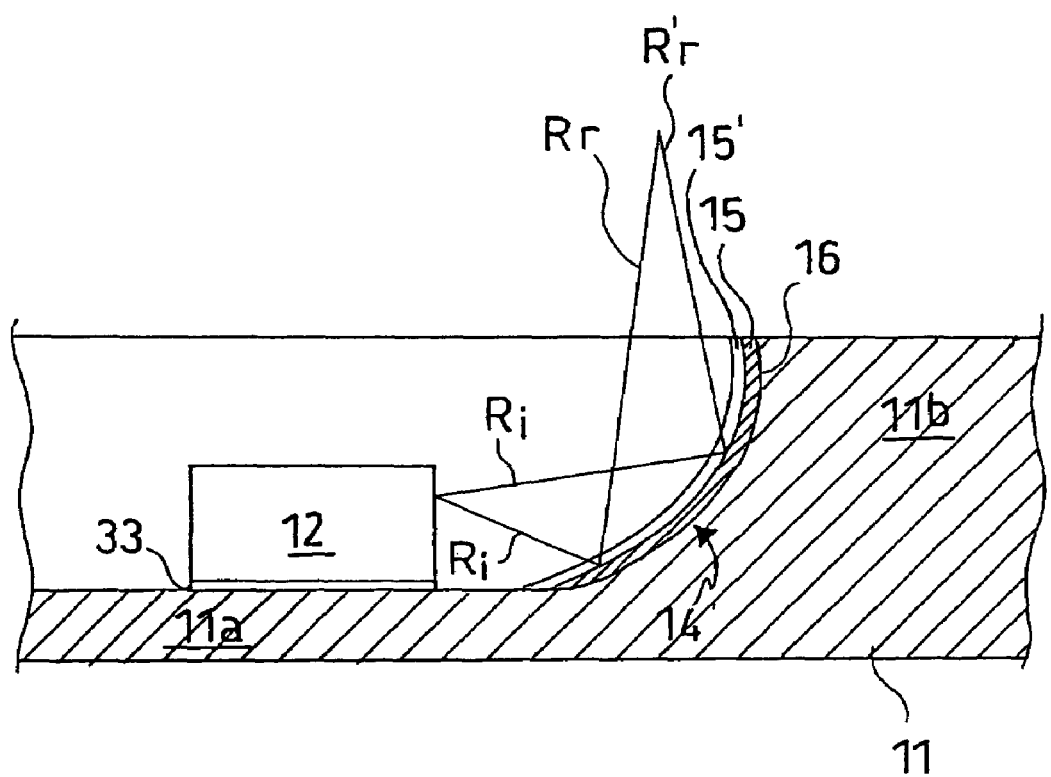
FIGS. 4 and 5 are respectively a side cross-sectional view and a prospective view of a reflection device that can be used in an optoelectronic unit in accordance with the invention.
Figure 5:
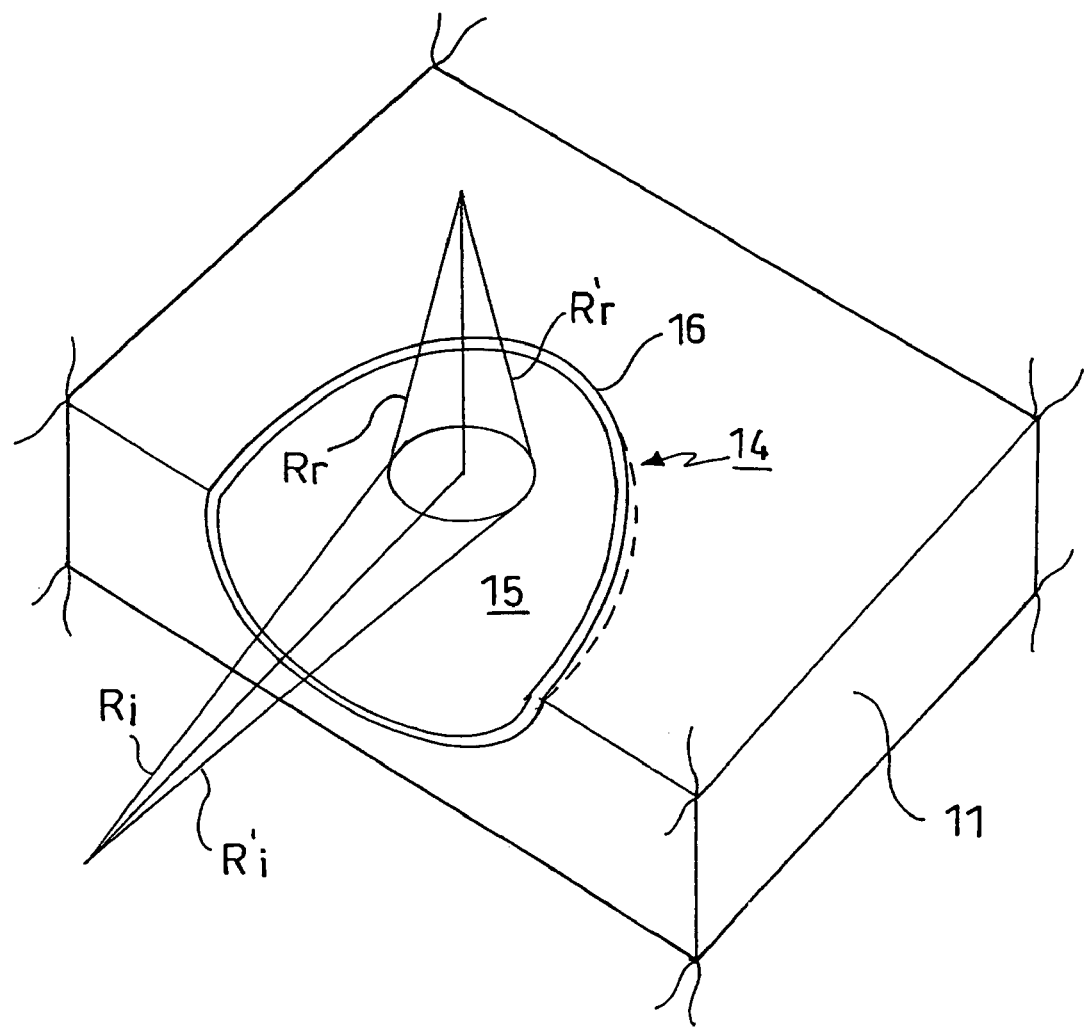

With reference to FIGS. 4 and 5 one possible structure of the reflection device 14 will now be described in greater detail. The reflection device 14 includes the reflective wall 15 arranged above a concave base surface 19, formed in the substrate 11.

The concave base surface 16 is a joining surface between the bottom wall 26 of the cavity 25 and the upper surface Sup of the substrate 11. In other words, it stretches two portions 11a and 11b of the substrate 11 having different thicknesses to one another.

Preferably, the reflective wall 15 is metallic and is obtained by a metalization of the concave base surface 16 of the substrate 11 with one or more metal layers, suitable for the reflection of radiation with optical wavelengths. For example, for the creation of the reflective wall aluminium, gold, or preferably silver, can be used.

In one particularly advantageous embodiment, the coupling device 14 includes on the metallic reflective wall 15 at least one protective layer 15', for example in silicon dioxide, for preventing oxidation of the reflective wall 15 itself.

As is evident to one skilled in the art, in the case in which the substrate 11 is formed by a material such as, for example, gold, suitable for the reflection of optical electromagnetic radiation, the metalization of the base surface 16 formed in the substrate 11 would not be necessary. In this case the reflective surface 15 and the base surface 16 would coincide.

The reflective wall 15 is suitable for receiving an incident electromagnetic radiation, which in this example is the radiation coming out from the laser 12, to produce reflected electromagnetic radiation. In other words, the reflective wall 15 operates as a mirror.

In the case described, in which the device 12 is a laser, the radiation coming out from port 13, is approximately a Gaussian beam. In FIG. 4, the segments Ri and Ri' identify in each point, along the direction of propagation, the quantity that is known as a divergence from the Gaussian beam. The reflective surface 15 is such that, with good approximation, the reflected radiation is confined within a reflective beam identified (in a qualitative way) by segments Rr and Rr'.

As shown in greater detail in FIG. 5, the reflective wall 15 (in the same way as the base 16) defines a concave three-dimensional surface in which the profile of its two sections with planes parallel and perpendicular to any axis of propagation of the incident electromagnetic radiation is a concave curve.

Examples of regular concave reflective surfaces that can be advantageously used for the reflection device 14 are listed below: portions of spherical, hyperbolic, ellipsoidal and parabolic surfaces, or more generally, portions of surfaces of the second order (quadric) or even of higher orders, for correcting any optical errors.

In particular, the reflective wall 15 is designed to generate a reflected electromagnetic radiation to be coupled in the input port 19 of the optical fiber 20. Advantageously, the reflective surface 15 makes it possible to focus the incident electromagnetic radiation. In other words, the reflective surface 15 if struck by an incident radiation having a diverging transverse field intensity distribution that generates a reflected electromagnetic radiation having a converging transverse electromagnetic field distribution intensity, and vice versa.

In greater detail as shown in FIG. 4, the reflected radiation is substantially confined within a beam with view angle α, and converges along the direction of propagation of the reflected radiation. In one particularly preferred embodiment, the view angle of the reflected beam is equal to the numerical aperture of the optical fiber 20. In this way, an optimum coupling is provided between the laser 12 and the optical fiber 20 that receives the reflected radiation.

In the apparatus 10, the laser 12 suitably powered by the rheophores 32 emits a diverging type optical beam. This optical beam strikes the concave reflective wall 15 which reflects and focuses it, thus making it a converging beam, suitable for reaching (through the window 30) the input port 19 of the optical fiber 20 and propagating inside the latter.

It should be observed that according to the embodiments described above, the laser 12 and the optical fiber 20 are advantageously optically coupled without interposition of lenses. That is, without interposition of optical elements to introduce important modifications to the characteristics of the optical beam in addition to those due to the reflection associated to the reflection device 14. In the same way, laser 12 and the reflection device 14 are coupled with one another without interposition of lenses, and the device 14 and the optical fiber 20 are coupled to one another without interposition of lenses.

Figure 6A:
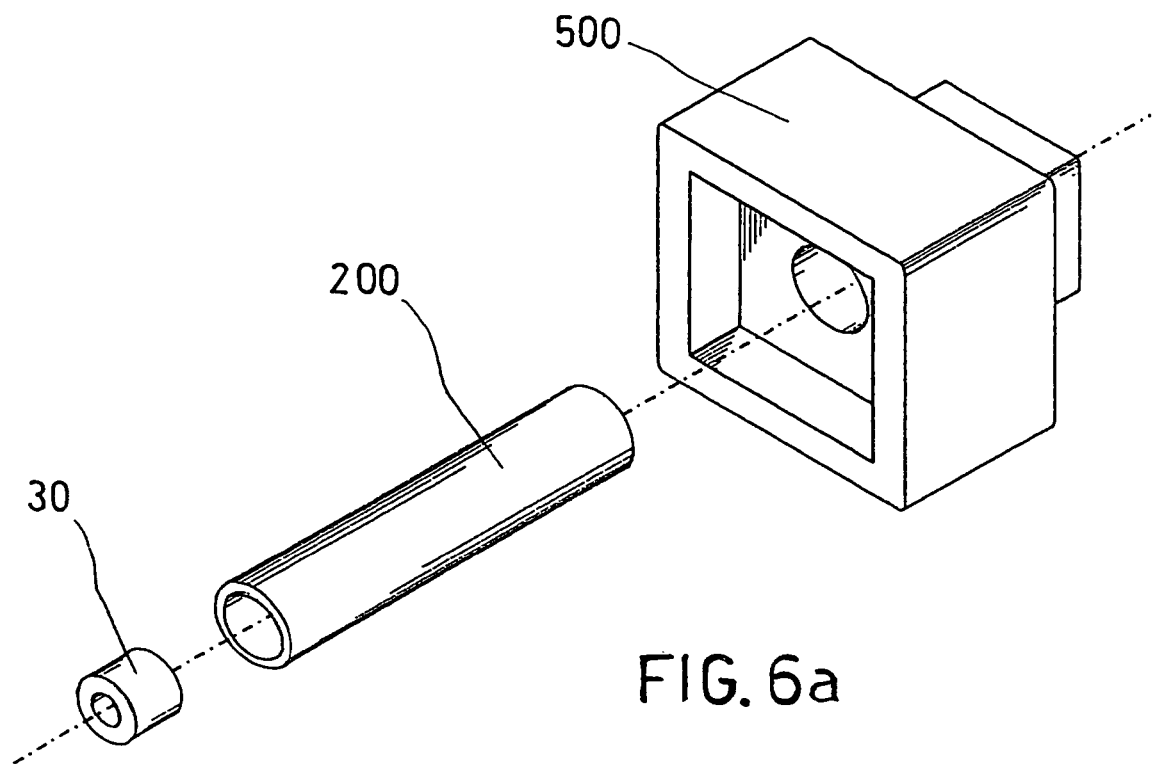
FIGS. 6A and 6B are respectively an exploded view and a cross-sectional view of a variation of the invention using an external sleeve.
Figure 6B:
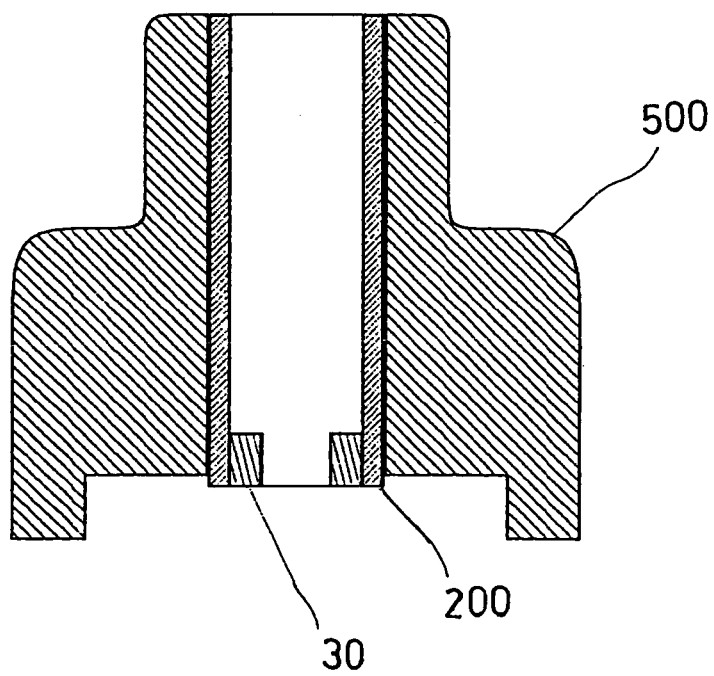

The optical apparatus 10 can provide a mechanical support for conferring greater sturdiness to the sleeve 200. FIGS. 6A and 6b show an example of such a mechanical support that is based upon an outer sleeve 500 in which at least part of the sleeve 200 and part of the tubular element 30 is inserted.

According to the embodiment of the invention shown in FIG. 2, from one free end 19″ of the ferrule 21, the optical fiber 20 is optionally provided with a plastic material coating. The use of the window 31 that also provides a closure of the hollow region in which the laser 12 is housed is particularly advantageous.

When the apparatus 10 is such that the step of insertion of the ferrule 21 into the sleeve 200 is performed by the same user, and not in the manufacturing phase, it is important to protect the cavity C that receives the laser 12 from contaminations.

According to one particular embodiment of the invention, it is possible that during the manufacturing step the optical fiber 20 is coupled to the ferrule 21 by glue and that the ferrule itself is coupled to the sleeve 200 also by glue. In this case, to avoid contaminations by the glue used or the gas released by the glue, the soldering of the window 31 to the edge of the tubular body 30 is especially advantageous.

According to a further embodiment of the invention, the optical apparatus 10 is not provided with the window 31 but the outer wall 19′ of the sleeve 200 is positioned, during manufacture, directly in contact with the upper edge of the tubular body 30.

In this case, it is particularly convenient to perform the coupling of the optical fiber 20 to the ferrule 21 and of the ferrule 21 to the sleeve 200 by soldering and not by gluing. The use of soldering avoids the generation of gases that can contaminate the laser 12, and ensures a relative seal of the hollow region containing the laser 12.

In accordance with a second embodiment of the invention, the optoelectronic device 12 is not a laser but is a photodetector or photoreceptor that can be applied, for example, to the bottom wall 26 in the same way as for the laser 12.

A photodetector suitable for being used in the apparatus of the invention is the detector known as a pin detector. A photodetector of this type is marketed, for example, by Honeywell.

This type of photodetector presents a substantially parallelepiped form and is provided with a portion to receive the optical radiation positioned on a lateral face of the parallelepiped. The face of the photodetector can be oriented in exactly the same way as shown in FIGS. 1–3 for the laser 12, in order to receive the radiation reflected by the reflection and focusing device 14. The functioning of the apparatus 10 in the presence of the photodetector 12 is obvious to those skilled in the art.

Advantageously, according to another embodiment, the reflective wall 15 defines a concave surface for collimating the incident electromagnetic radiation. In other words, the reflective wall 15 produces, starting from an incident electromagnetic radiation having a diverging transverse distribution of field intensity, a reflective electromagnetic radiation having a transverse distribution of electromagnetic field intensity that substantially presents the characteristics of a collimated beam.

It should be pointed out that a collimated beam presents a transverse distribution of field intensity approximately constant along the direction of propagation of the electromagnetic radiation. For example, to produce a reflected collimated beam, it is sufficient that the reflective surface 15 has a parabolic profile and that the output interface 13 of optical radiation is arranged in focus of the surface.

With regards to the optoelectronic unit 300, an example of a manufacturing process of the same starting from the support substrate 11 will be described below. The fixing groove 24 can be obtained by conventional type photolithographic techniques. For example, the forming process of the fixing groove 24 foresees the use of a mask, the deposition of a layer of photoresist and oxide on the surface Sup of the support substrate 11.

Subsequently, a development step of the photoresist is performed, which provides the formation of apertures in the photoresist and in the oxide and an attachment step of the substrate 11. Preferably, this attachment is a chemical anisotropic attachment that creates the fixing groove 24.

Photolithographic techniques are also used to create in the support substrate 11 the hollow region 25 in which the laser 12 will be coupled. The formation of the hollow region 25 can be performed in completely the same way as the formation of the fixing groove 24 and foresees the use of a mask, the development of a layer of photoresist and a subsequent attachment of the substrate 11. In particular, the formation of the fixing groove 24 and of the hollow region 25 can take place using a single mask and a single attachment step to the substrate.

With regards to the formation of the reflection device 14, and in particular, of the concave base surface 16 photolithographic techniques known in the integrated optical component production sector can be used.

For example, techniques suitable for the creation of the base surface 16 are described in U.S. Pat. No. 5,480,764 that describes, additionally, methods for the formation of concave reflective and focusing surfaces based on the photolithographic technique that uses a mask in gray scales, known as a gray scale mask. U.S. Pat. No. 6,107,000 also provides teachings relative to the techniques based on a gray scale mask.

As is clear to those skilled in the art, the creation of the base surface 16 may, for example, entail the use of a gray scale mask that can be formed by a plate of glass made opaque by an electronic beam. This plate is opaqued to record in it a gray scale correlated to the form desired for the base surface 16, and in particular, corresponding to predetermined depths of level of attachment of a layer of photoresist.

The gray scale mask is therefore used to expose a layer of photoresist, arranged on the upper surface Sup of the support substrate 11, to a suitable radiation. The layer of photoresist, treated by the radiation that has crossed the gray scale mask, undergoes polymerization that is non-uniform but correlated to the form of the surface 16 that one wishes to obtain.

Subsequently, the layer of photoresist and the underlying support substrate 11 are attached to remove portions of the substrate 11 of different depths, thus obtaining the base surface 16. This attachment can be, preferably, a chemically assisted ion beam milling ion beam type. Alternatively to the gray scale mask, a phase mask for example, similar to those used in the manufacture of an optical fiber lattice can be used.

The manufacturing process in accordance with the invention also includes a metalization step for the formation of a metallic pad 33 (see FIG. 4) on which the laser 12 is coupled. The metalization step can also be conducted using the photolithographic technique that foresees the formation of an aperture in a layer of oxide arranged on the bottom wall 26 inside which a metallic layer, for example, gold, is deposited.

Subsequently, the laser 12 is coupled by soldering to the pad thus obtained according to a conventional technique known as die attach of the laser. This soldering step is of a conventional type and can lead to a precision of alignment of between 1 and 10 µm. The laser 12 is coupled to the pad positioned on the bottom wall 26 in such a way as to be correctly aligned with the reflection device 14.

Advantageously, 33 alignment signs useful for the correct orientation of the laser 12 on the pad itself may be made on the metallic pad. In this case, further signs to match with the signs formed on the pad 33 are formed on the lower wall of the laser 12. The use of alignment signs is advantageous in applications that require extreme precision in the alignment between the laser 12 and the reflection device 14. Such alignment signs have, for example, the form of crosses, lines, etc., and are made using a photolithographic technique to create an optical type contrast, visible using a microscope or a video camera.

In a subsequent step, the blockage structure 29 is coupled to the upper surface Sup of the substrate 11. In this step, a lower edge of the tubular structure 30 is glued or soldered to a region of the upper surface Sup inside an area that can be defined by the fixing groove 24.

For the coupling of the blockage structure 29, it is particularly convenient to use soldering instead of resins that can contaminate the cavity C that houses the laser 12. In addition, inside the cavity C identified by the tubular structure 30, a gas such as nitrogen is inserted, until saturation, to create an inert atmosphere to avoid contamination of the laser 12.

The method of the invention also foresees the coupling to the base 28, by gluing or soldering, to a wall of the support substrate 11 opposite to the upper surface Sup.

The operation of inserting the rheophores 32 into the holes made in the base 28 is conventional, as readily appreciated by those skilled in the art. With regards to the assembly of the components of the optical apparatus 10, the manufacture of the optoelectronic unit 300 is complete.

A step of coupling the sleeve 200 to the support substrate 11 of the optoelectronic unit 300 forming the optical module 400 is then performed. According to a particular embodiment of the invention, the coupling takes place by arranging glue inside the fixing groove 24. Subsequently, the edge 23 of the sleeve 200 is placed inside the fixing groove 24 thus causing a re-dislocation of the glue, which may partially leak from the groove itself.

The ferrule 21, provided with the optical fiber 20, is inserted into the cavity 22 of the sleeve 200 in such a way that its outside edge 19' (aligned with end 19 of the optical fiber 20) is brought into contact with an upper surface of the window 31. This ensures that the laser 12, the reflection device 14 and the end 19 of the optical fiber 20 are correctly arranged, thus providing optical coupling.

The optical apparatus 10 of the present invention presents considerable advantages over the state of the art apparatus. The optical apparatus 10 and the optical module 400 ensure a good coupling efficiency between the optical fiber 20 and the optoelectronic device 12.

This is also due to the fact that the apparatus of the invention presents the reflection device 14 integrated, preferably, by a photolithographic technique, in the same support substrate 11 on which the optoelectronic device 12 (a laser or a photodetector) is coupled. Therefore, the correct positioning of the reflection device 14 is based on a photolithographic type process that ensures high precision.

Moreover, the positioning of the sleeve 200, used for coupling the ferrule 21 containing the optical fiber 20 can be performed with high precision because it takes place via the groove 24, which can also be obtained by a photolithographic process.

Particularly precise alignment of the optical components of the apparatus 10 can also be obtained because the same optoelectronic device 12 can be coupled to the support substrate 11 with the aid of photolithographic techniques. This is for the formation of the fixing or coupling pad, or for the formation of the signs useful for orientation.

The optical apparatus of the invention, not necessarily requiring the use of optical lenses, also makes it possible to reduce the cost of production in relation to conventional modules. In addition, it presents a limited number of optical components to align, thus making the operation of apparatus assembly uncomplicated.

Obviously, those skilled in the art can perform a number of alterations and variations to the module and apparatus described above, all of which remain within the scope of the invention, as defined by the following claims.

That which is claimed is:

1. An optical module comprising:
   a substrate;
   an optoelectronic device on said substrate;
   a coupling device on said substrate for optically coupling said optoelectronic device to a guided optical propagation device;
   said coupling device comprising a reflective surface integrated into said substrate and positioned in an optical path between said optoelectronic device and the guided optical propagation device for permitting mutual optical coupling therebetween, said reflective surface receiving incident optical radiation from the guided optical propagation device and providing reflected optical radiation to said optoelectronic device;
   a blockage structure in direct contact with the guided optical propagation device for positioning the guided optical propagation device at a preset distance from said reflective surface, said blockage structure comprising
   at least one support wall coupled to said substrate, and
   an optical window coupled to said at least one support wall for allowing the optical coupling without interposition of lenses between the guided optical propagation device and said reflective surface,
   said at least one support wall, said optical window and a surface of said substrate defining a hollow region in which said optoelectronic device is housed.

2. An optical module according to claim 1, wherein said reflective surface comprises a concave reflective wall.

3. An optical module according to claim 2, wherein the incident optical radiation received by said concave reflective surface has a diverging transverse distribution of field intensity; and wherein said concave reflective surface provides the reflected optical radiation having a converging transverse distribution of field intensity.

4. An optical module according to claim 2, wherein the incident optical radiation received by said concave reflective surface has a diverging transverse distribution of field intensity; and wherein said concave reflective surface provides the reflected optical radiation having a collimated transverse distribution of field intensity.

5. An optical module according to claim 2, wherein said concave reflective wall defines at least a portion of one of the following surfaces: a spherical surface, a hyperbolic surface, an ellipsoidal surface and a parabolic surface.

6. An optical module according to claim 2, wherein said substrate comprises a concave base surface supporting said concave reflective wall.

7. An optical module according to claim 6, wherein said substrate comprises a first substrate portion and a second substrate portion adjacent said first substrate portion, with said first and second substrate portions having different thicknesses; and wherein said concave base surface is a joining surface between said first and second substrate portions.

8. An optical module according to claim 2, wherein said concave reflective wall comprises a layer of conductive material.

9. An optical module according to claim 2, wherein said coupling device further comprises a layer of protective material for preventing oxidation of said concave reflective walk.

10. An optical module according to claim 1, wherein said reflective surface and the guided optical propagation device are optically coupled without the interposition of lenses therebetween.

11. An optical module according to claim 1, wherein said reflective surface and said optoelectronic device are optically coupled without the interposition of lenses therebetween.

12. An optical module according to claim 1, wherein the guided optical propagation device comprises an optical fiber.

13. An optical module according to claim 12, wherein the guided optical propagation device further comprises a ferrule coupled to the optical fiber.

14. An optical module according to claim 1, wherein said optoelectronic device is on an upper surface of said substrate, and comprises an input/output optical radiation port that is transversely positioned with respect to the upper surface of said substrate.

15. An optical module according to claim 14, further comprising a conductive coupling pad between said optoelectronic device and the upper surface of said substrate.

16. An optical module according to claim 1, wherein said optoelectronic device comprises a laser for generating optical radiation to be sent to the guided optical propagation device by reflecting off of said reflective surface.

17. An optical module according to claim 16, wherein said laser comprises a semiconductor type laser.

18. An optical module according to claim 1, wherein said optoelectronic device comprises a photodetector for receiving the reflected optical radiation from said reflective surface.

19. An optical module according to claim 1, further comprising:
a plurality of conductive leads; and
a base substrate coupled to said substrate, and providing an electrical connection between said plurality of conductive leads and said optoelectronic device.

20. An optical module according to claim 1, further comprising a support and positioning structure coupled to said substrate for interfacing with the guided optical propagation device.

21. An optical module according to claim 20, wherein said substrate includes a groove for receiving said support and positioning structure.

22. An optical module according to claim 20, wherein said support and positioning structure comprises a sleeve inside which the guided optical propagation device can be at least partially inserted.

23. An optical apparatus comprising:
a guided optical propagation device; and
an optical module adjacent said guided propagation device and comprising
a substrate,
an optoelectronic device on said substrate, and
a coupling device on said substrate for optically coupling said optoelectronic device to said guided propagation device,
said coupling device comprising a reflective surface integrated into said substrate and positioned in an optical path between said optoelectronic device and said guided propagation device,
a plurality of conductive leads; and
a base substrate coupled to said substrate, and providing an electrical connection between said plurality of conductive leads and said optoelectronic device.

24. An optical apparatus according to claim 23, wherein said reflective surface comprises a concave reflective wall.

25. An optical apparatus according to claim 24, wherein said concave reflective wall comprises
a layer of conductive material; and
a layer of protective material on said layer of conductive material for preventing oxidation of said concave reflective wall.

26. An optical apparatus according to claim 23, wherein said reflective surface and said guided optical propagation device are optically coupled without the interposition of lenses therebetween.

27. An optical apparatus according to claim 23, wherein said reflective surface and said optoelectronic device are optically coupled without the interposition of lenses therebetween.

28. An optical apparatus according to claim 23, wherein said guided optical propagation device comprises:
an optical fiber; and
a ferrule coupled to the optical fiber.

29. An optical apparatus according to claim 23, wherein said optical module further comprises a blockage structure in direct contact with the guided optical propagation device for positioning the guided optical propagation device at a preset distance from said reflective surface.

30. An optical apparatus according to claim 29, wherein said blockage structure comprises:
at least one support wall coupled to said substrate; and
an optical window coupled to said at least one support wall for allowing the optical coupling without interposition of lenses between the guided optical propagation device and said reflective surface;
said at least one support wall, said optical window and a surface of said substrate defining a hollow region in which said optoelectronic device is housed.

31. An optical apparatus according to claim 23, wherein said optoelectronic device is on an upper surface of said substrate, and comprises an input/output optical radiation port that is transversely positioned with respect to the upper surface of said substrate.

32. An optical apparatus according to claim 23, wherein said optoelectronic device comprises a laser for generating optical radiation to be sent to the guided optical propagation device by reflecting off of said reflective surface.

33. An optical apparatus according to claim 23, wherein said optoelectronic device comprises a photodetector for receiving the reflected optical radiation from said reflective surface.

34. An optical apparatus according to claim 23, further comprising a support and positioning structure coupled to said substrate for interfacing with said guided optical propagation device.

35. A method for manufacturing an optical module to be optically coupled to a guided optical propagation device, the method comprising:
  positioning an optoelectronic device on a substrate, and
  forming a coupling device on the substrate for optically coupling the optoelectronic device to a guided propagation device, the coupling device comprising a reflective surface integrated into the substrate and positioned in an optical path between the optoelectronic device and the guided propagation device, the forming comprising
    providing a gray scale mask correlated to a desired shape of the concave reflective wall,
    forming a layer of photoresist on the substrate, and using the gray scale mask for exposing the layer of photoresist to electromagnetic radiation, and
    removing the layer of photoresist and portions of the substrate to obtain a concave surface corresponding to the concave reflective wall.

36. A method according to claim 35, wherein the reflective surface comprises a concave reflective wall.

37. A method according to claim 35, further comprising coupling a support and positioning structure to the substrate for interfacing with the guided optical propagation device.

38. A method according to claim 37, further comprising:
  forming a groove in the substrate; and
  inserting a free end of the support and positioning structure into the groove.

39. A method according to claim 35, further comprising forming a conductive coupling pad on the substrate; and wherein positioning the optoelectronic device comprises coupling the optoelectronic device to the conductive coupling pad.

40. A method according to claim 39, further comprising forming a plurality of alignment indicators on at least on one of the conductive coupling pad and a sidewall of the optoelectronic device for ensuring a correct orientation of the optoelectronic device on the conductive coupling pad.

* * * * *

UNITED STATES PATENT AND TRADEMARK OFFICE
CERTIFICATE OF CORRECTION

PATENT NO. : 7,223,024 B2
APPLICATION NO. : 11/015363
DATED : May 29, 2007
INVENTOR(S) : Antonio Fincato It is certified that error appears in the above-identified patent and that said Letters Patent is hereby corrected as shown below:

Title page item (30) (Priority data info missing)   Insert: -- Foreign Application Priority Data
    EP    03425823.6    12/24/03 --

Column 3, Line 11   Delete: " prospective "
Insert: -- perspective --

Column 8, Line 64   Delete: " beam milling "
Insert: -- beam or milling --

Column 11, Line 24   Delete: " walk "
Insert: -- wall --

Signed and Sealed this

Sixteenth Day of October, 2007

JON W. DUDAS
*Director of the United States Patent and Trademark Office*